C. ATHANASOPOULOS.
SAFETY FENDER.
APPLICATION FILED NOV. 14, 1916.
1,246,840.
Patented Nov. 20, 1917.
2 SHEETS—SHEET 1.
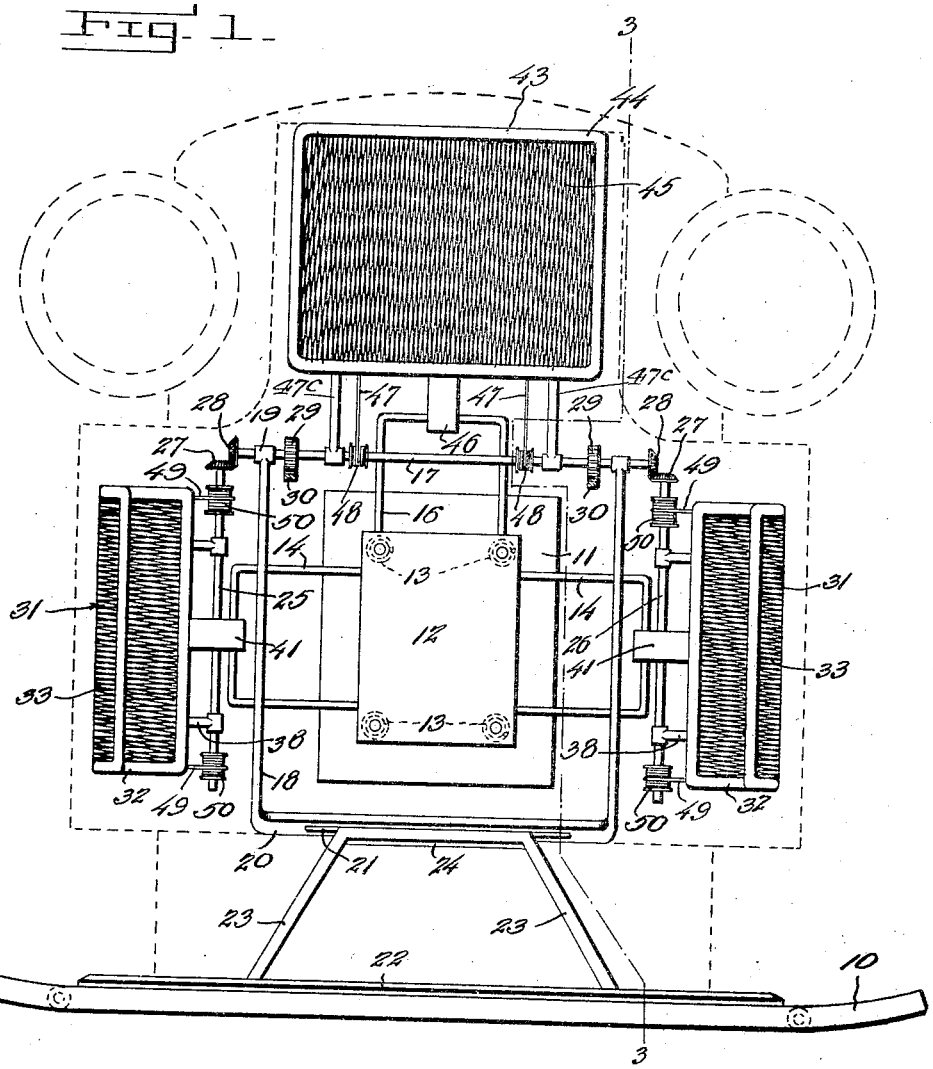
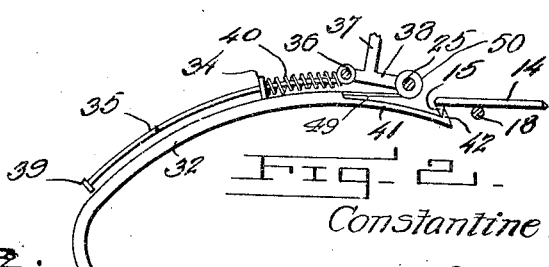
INVENTOR
Constantine Athanasopoulos,
BY
ATTORNEY
WITNESSES

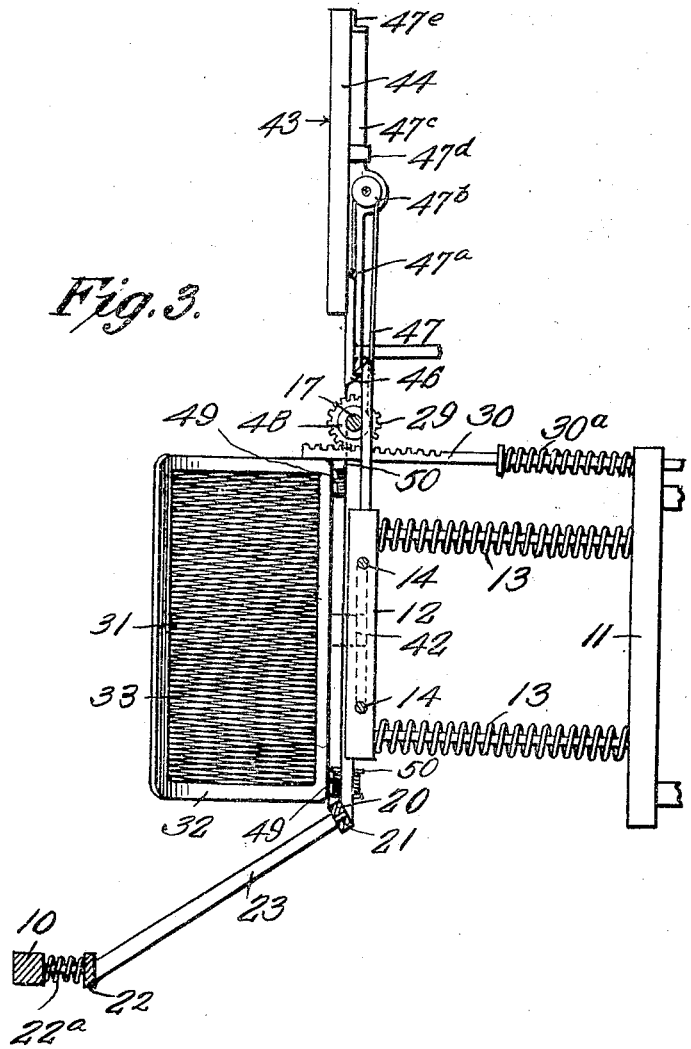

UNITED STATES PATENT OFFICE.

CONSTANTINE ATHANASOPOULOS, OF WASHINGTON, DISTRICT OF COLUMBIA.

SAFETY-FENDER.

1,246,840.  Specification of Letters Patent.  Patented Nov. 20, 1917.

Application filed November 14, 1916. Serial No. 131,326.

*To all whom it may concern:*

Be it known that I, CONSTANTINE ATHANASOPOULOS, a subject of the King of Greece, residing at Washington, in the District of Columbia, have invented certain new and useful Improvements in Safety-Fenders, of which the following is a specification.

This invention has relation to improvements in safety fenders and like devices which are primarily designed to be used on automobiles and other self propelled vehicles, and as its main object it aims to provide a novel arrangement of releasably held arms, the purpose of which is to embrace and thus protect the pedestrian who has been struck by the vehicle.

Various other objects and advantages will become apparent during the continuance of the following description.

These objects are accomplished by such means as are shown in their preferred form in the accompanying drawings, described in the following specification and then more specifically pointed out in the appended claims.

In the accompanying drawings wherein like characters designate like parts throughout the several views:—

Figure 1 is a view in front elevation showing, diagrammatically my improved fender apparatus associated with the bumper of an automobile, the hood of the automobile being shown in dotted lines, Fig. 2 is a view in top plan of the side or embracing arms of the fender, illustrating the means for normally retaining the arms in a closed or set position, and Fig. 3 is a somewhat enlarged vertical sectional view, the section being taken along line 3—3 of Fig. 1.

In the drawings I have shown my improved fender apparatus associated with the hood of an automobile that has been shown in dotted lines. The purpose of such an illustration is to make clear the general relation of the fender to the automobile should the device be used in connection with a vehicle of that nature. If used in this capacity the releasement of the side or embracing arms as well as the protector plate may be effected either directly or indirectly from the bumper 10 (see Fig. 1) as well as from other sources such as will subsequently appear.

The fender proper consists more essentially of a body or base plate 11 which carries forwardly thereof a trigger plate 12 that is yieldably mounted on the plate 11, through the medium of springs 13. Plate 12 carries laterally projecting members 14 which are in turn provided with outstanding catches 15 the purpose of which will be subsequently described. Plate 12 further carries a vertically disposed member 16 that is likewise provided with a suitable catch member. From the above it will be noted that, upon striking an obstruction, plate 12 will yield, due to the elasticity of the springs 13 thus effecting simultaneous disengagement of the members 14 from the catches 15.

17 designates a horizontally disposed shaft upon which is swingingly mounted an inverted substantially U shaped frame 18, as at 19, this frame lying slightly in advance of the members 14 as clearly shown in Fig. 1. The lower or bridge portion 20 of the frame is cut out longitudinally as at 21 to provide a recess or channel the purpose of which will presently appear.

22 designates a member that carries the bumper 10, said member being provided with rearwardly projecting arms 23 which are connected by a cross bar 24 secured in the recess or channel 21 of the frame 18. Member 22 is yieldingly connected to the bumper by springs $22^a$, and, by reason of its intimate relation with the bumper 10, is moved rearwardly when the bumper strikes an obstruction thus effecting a backward rocking of the frame 18 such as will in turn move members 14 and 16.

25 and 26 indicate vertically disposed shafts which carry at their upper ends beveled gears 27 that have co-meshing engagement with beveled gears 28 of the shaft 17. Shaft 17 carries pinions 29 that may be actuated by rack bars 30, from a suitable point on the automobile or other vehicle thus effecting the rotation of the shaft 17 as well as the shafts 25 and 26. Springs $30^a$ are shown in Fig. 3, as one means whereby the racks 30 may be pushed forward, so as to rotate the shafts 17, 25, and 26.

Embracing arms 31 are provided, and each consists of a rectangular frame 32, suitably curved as shown in Fig. 2, and which carries a section of wire mesh or other resilient recticular material such as shown at 33. These arms are provided with rearwardly directed ears 34 which have openings to receive suitably curved guide rods 35; the guide rods being in turn carried upon vertically disposed shafts 36 that are supported by such means as shown at 37 and 38. At their free ends each of the guide rods 35 carries a stop 39, while between the shafts 36 and the ears 34 they carry suitable expansion springs 40.

At their inner ends, arms 31 carry inwardly projecting tongues 41 which have suitable catches 42 for engagement of the catches 15 with the members 14. Consequently, when the parts are in the position shown in Fig. 2, arms 31 will be held in their outermost position against the tension of the springs 40. However, upon movement of the members 14, the disengagement of the catches 15 and 42 is effected, and thus the arms will be moved to their innermost position by means of the springs 40.

The protecting arm or plate such as designated in its entirety by the numeral 43 is preferably constructed of a rectangular frame 44 that carries suitable wire mesh 45 or other resilient material, as shown in Fig. 1, the said arm or plate carrying a tongue 46 that has a catch engaged by the catch on the member 16. Means are provided for the purpose of moving the arm or plate 43 vertically upon releasement of the tongue 46 as follows:

For the purpose of drawing the head protecting plate or cushion 43 to its uppermost position after it has been released I provide the same with suitable cables 47 which wind on drums 48 that are carried by the shaft 17 and are rotatable thereby. Each of the cables 47 has one end secured at 47$^a$ to the cushion member 43, while its intermediate portion extends over a sheave wheel 47$^b$ which may be supported by the guide member 47$^c$. There are two of these guide members, as illustrated in Fig. 1, and suitable guide levers 47$^d$ may be provided for the guides 47$^c$ to slide through, while stops 47$^e$ may be provided for limiting the downward movement of the member 43. Likewise I provide arms 31 with cables 49 which wind on drums 50 which are carried on the shafts 25 and 26 respectively. Consequently, upon rotation of the shaft 17 and the shafts 25 and 26 all of the arms may be again moved into a set position after they have been operated.

In the operation of my invention, it will be seen that the arms may be released either through the instrumentality of the bumper or directly from the trigger plate. In any event, rearward movement of the trigger plate is effected, which causes the simultaneous disengagement of the members 14 and 15. The side arms move so as to embrace the pedestrian while the protecting arm or plate is thrust upwardly to prevent the pedestrian's head and the upper part of his body from being thrown backwardly.

Considering the operation of the device in detail, let it be assumed that either the bumper 10 or the trigger plate 12 has struck a person; in either event, the elements 14 and 16 are moved rearward out of engagement with the latches 41 and 46, thereby releasing the elements 31 and 43 and allowing elements 31 to be moved by their springs 40 against the resistance of the cords or cables 49. However, the shafts 25 and 26 begin at once to rotate in the direction for allowing the movement of the elements 31 in the direction previously described, so that they effectually grasp the person which has been struck by the bumper or trigger plate, thereby preventing such person from falling to the ground and being run over by the machine. The turning of the shafts 17, 25, and 26 is effected by the gear wheels 29 and racks 30, which are moved forward by their respective springs 30$^a$; such forward movement of the racks rotating the drums 48 in the direction for moving cushion 43 upward, through the instrumentality of the cords or cables 47.

From the foregoing it is believed that the advantages and novel feature of my invention will be readily understood and therefore further detailed description is deemed unnecessary.

In reducing the invention to practice, it will be found that the form referred to herein as the most practical and preferred embodiment is the most efficient, but realizing that certain conditions will necessarily vary in concurrence with the adoption of the device, it is emphasized that various minor changes in the details of construction and in the proportion of parts may be resorted to when required without sacrificing any of the advantages of the invention, as defined in the appended claims.

Having thus fully described the invention, what is claimed as new and desired to be secured by Letters Patent:—

1. In a device of the character described, a fender including embracing arms movable horizontally, a protecting arm movable vertically, and means to operate said arms when said fender strikes an obstruction.

2. In a device of the character described, a fender including embracing arms movable horizontally, a protecting arm movable vertically, means to normally retain said embracing arms in an open position, means to release all said arms simultaneously, and means to operate said arms.

3. In a device of the character described, the combination with an automobile, of a fender including embracing arms movable horizontally, a protecting arm movable vertically, means to normally retain said embracing arms in an open position, means to release all said arms simultaneously when said fender strikes an obstruction, means to operate said arms, and means to return said arms to operative position.

4. In a device of the character described, the combination with an automobile, and a bumper carried thereby, of a fender including embracing arms movable horizontally, a protecting arm movable vertically, means to normally retain said embracing arms in an open position, means associated with said bumper to release all said arms simultaneously when said bumper strikes an obstruction, means to operate said arms upon being released, and means to return said arms to their normal position.

5. In a device of the character described, the combination with an automobile, and a bumper carried thereby, of a fender including embracing arms movable horizontally, a protecting arm movable vertically, means to retain said embracing arms in an open position, means associated with said bumper to release all said arms simultaneously when said bumper strikes an obstruction, means to move said embracing arms in the arc of a circle, and means to return said arms to an open position.

In testimony whereof I affix my signature in presence of two witnesses.

CONSTANTINE ATHANASOPOULOS.

Witnesses:
SOTERIOS NICHOLSON,
J. REANEY KELLY.